US007421578B1

(12) United States Patent
Huang et al.

(10) Patent No.: US 7,421,578 B1
(45) Date of Patent: Sep. 2, 2008

(54) METHOD AND APPARATUS FOR ELECTING A LEADER NODE IN A COMPUTER NETWORK

(75) Inventors: Geoffrey Huang, Mountain View, CA (US); Brian Weis, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 862 days.

(21) Appl. No.: 10/625,445

(22) Filed: Jul. 22, 2003

(51) Int. Cl.
*H04L 9/00* (2006.01)
(52) U.S. Cl. .................. 713/163; 370/254; 709/201
(58) Field of Classification Search .............. 713/163
See application file for complete search history.

(56) References Cited

U.S. PATENT DOCUMENTS

| 5,634,011 | A  | * | 5/1997 | Auerbach et al. | ........... | 709/242 |
|-----------|----|---|--------|-----------------|------------|---------|
| 6,256,309 | B1 |   | 7/2001 | Daley et al. | | |
| 6,529,498 | B1 |   | 3/2003 | Cheng | | |
| 6,563,798 | B1 |   | 5/2003 | Cheng | | |
| 6,600,724 | B1 |   | 7/2003 | Cheng | | |
| 6,718,394 | B2 | * | 4/2004 | Cain | ........... | 709/242 |
| 6,732,189 | B1 | * | 5/2004 | Novaes | ........... | 709/249 |
| 6,748,447 | B1 | * | 6/2004 | Basani et al. | ........... | 709/244 |
| 6,993,587 | B1 | * | 1/2006 | Basani et al. | ........... | 709/229 |

OTHER PUBLICATIONS

Jonathan K. Millen and Grit Denker, CAPSL and MuCAPSL, Journal of Telecommunications and Information Technology, Apr. 2002, http://www.itl.waw.pl/czasopisma/JTIT/2002/4/16.pdf and retrieved date Dec. 25, 2006.*
D. Maughan, et al., "Internet Security Association and Key Management Protocol (ISAKMP)," Nov. 1998, Network Working Group, Request for Comments: 2408, http://www.ietf.org/rfc/rfc2408.txt?number=2408, printed Dec. 5, 2003, pp. 1-81.
M. Baugher, et al., The Group Domain of Interpretation, Jul. 2003, Network Working Group, Request for Comments: 3547, http://www.ietf.org/rfc/rfc3547.txt?number=3547, printed Dec. 5, 2003, pp. 1-45.

(Continued)

*Primary Examiner*—Gilberto Barron, Jr.
*Assistant Examiner*—Samson Lemma
(74) *Attorney, Agent, or Firm*—Hickman Palermo Truong & Becker LLP (57) ABSTRACT

A method performed by a first computer node for selecting a leader node to provide service to a plurality of other nodes in a multicast group, wherein each of the nodes communicates using multicast messages, comprises issuing a first election call message; receiving candidacy announcement messages from one or more leader candidate nodes in a specified time period; selecting a victor from among all leader candidate nodes from which candidacy announcement messages are received; receiving one or more victor announcement messages from one or more leader victor nodes for a second specified time period; resolving zero or more collisions among the victor announcement messages to result in selecting the leader node. One embodiment provides a dynamic secure protocol for electing a key server, such as a key server that is suited for use with a group key exchange protocol such as the Group Domain of Interpretation (GDOI). Public key signatures may be used to secure message exchanges and to provide for authentication of network nodes in a multicast group.

66 Claims, 5 Drawing Sheets

OTHER PUBLICATIONS

S. Kent, et al., "Security Architecture for the Internet Protocol," Nov. 1998, Network Working Group, Request for Comments: 2401, http://www.ietf.org/rfc/rfc2401.txt?number=2401, printed Dec. 5, 2003, pp. 1-62.

D. Eastlake, et al., "US Secure Hash Algorithm 1 (SHA1)," Sep. 2001, Network Working Group, Request for Comments: 3174, http://www.ietf.org/rfc/rfc3174.txt?number=3174, printed Dec. 5, 2003, pp. 1-21.

E. Rescorla, "Diffie-Hellman Key Agreement Method," Jun. 1999, Network Working Group, Request for Comments: 2631, http://www.ietf.org/rfc2631.txt?number=2631, printed Dec. 5, 2003, pp. 1-13.

D. Harkins, et al., "The Internet Key Exchange (IKE)," Nov. 1998, Network Working Group, Request for Comments: 2409, http://www.ietf.org/rfc/rfc2409.txt?number=2409, pp. 1-39.

R. L. Rivest, et al., "A Method for Obtaining Digital Signatures and Public-Key Cryptosystems," *Communications of the ACM*, vol. 21, No. 2, Feb. 1978, pp. 120-126.

Yih Huang, et al., "Group Leader Election under Link-State Routing," Proceedings of International Conference on Network Protocols, 1997, IEEE, pp. 95-104.

Indranil Gupta, et al., "A Probabilistically Correct Leader Election Protocol for Large Groups," International Symposium on Distributed Computing, 2000, 15 pages.

Michael J. Fischer, et al., "Impossibility of Distributed Consensus with One Faulty Process," Journal of the Association for Computing Machinery, vol. 32, No. 2, Apr. 1985, pp. 374-382.

Thomas Kostas, et al., "Key Management for Secure Multicast Group Communication in Mobile Networks," DARPA, undated, pp. 1-3.

Thomas Kostas, et al., "A Hierarchical Key Management System for Secure Multicast Group Communications in JTRS," DARPA, PTN#869, undated, pp. 1-15.

Sundarshan Vasudevan, et al., "Secure Leader Election Wireless Ad Hoc Networks," Umass Computer Science Technical Report 01-50, undated, published 2001, pp. 1-31.

Cisco Systems, Inc., "PNNI Migration Examples," Oct. 30, 2002, pp. 1-18.

Cisco Systems, Inc., "Cisco MGX 8800 Series Switches," Sep. 7, 2003, pp. 1-76.

Cisco Systems, Inc., "Configure PNNI Port Control Virtual Channel—PXM45, PXM1E," Part No. 78-14789-01 Rev. CO, Sep. 2003, pp. 2-261-2-304.

Cisco Systems, Inc., "ATM Routing," Release 1, Part No. 78-12275-02 Rev. AO, Mar. 2001, pp. 2-1-2-26.

Cisco Systems, Inc., "Configuring ATM SVCs, PNNI Routing, and SPVCs," Release 1, Part No. 78-6123-05 Rev. AO, Mar. 2001, pp. 5-1-5-50.

* cited by examiner

METHOD AND APPARATUS FOR ELECTING A LEADER NODE IN A COMPUTER NETWORK

FIELD OF THE INVENTION

The present invention generally relates to computer networks. The invention relates more specifically to a method and apparatus for electing a key server in a multicast group.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Many applications rely on multicast for communication amongst multiple nodes. In a group of n members, if a sender wants to send a packet to all other members, the sender can multicast the message once. This delivers the packet to all other group members. By contrast, with unicast, the sender would have to send (n−1) individual messages. Increasingly, multicast applications such as audio conferencing and multicast routing require secure delivery of packets.

There are many networking applications in which a network device, such as a router, switch, gateway, etc., can belong to an Internet Protocol (IP) multicast group. For example, sometimes routers in a group exchange control information where the integrity of that information is vital to the continued health of the attached network, the locally administered network, or large segments of the Internet. Typically, multicast groups comprise groups of routers, switches or other infrastructure elements in a network that receive packet data traffic that is sent using multicast protocols. To prevent non-members from using multicast traffic, the multicast traffic is encrypted using an encryption key that is known only to members of the multicast group.

This traffic can be secured with one or more data transforms, such as IPsec, as defined in Kent, S. and Atkinson, R. "Security Architecture for the Internet Protocol," IETF Request for Comments (RFC) 2401, 1998. Before multicast groups can use IPSec to encrypt and authenticate packets on a scalable level, group members must be able to share and exchange encryption keys dynamically. The Multicast Security working group (MSEC) within the Internet Engineering Task Force (IETF) has proposed the Group Domain of Interpretation (GDOI) as a protocol to exchange keys within multicast groups. GDOI is described in IETF RFC 3547, which is available at the time of this writing at the RFC folder of the domain ietf.org on the World Wide Web. GDOI relies on a key server to generate encryption keys, then to push the keys down to group members. This helps salability and security by providing the ability to dynamically generate and refresh encryption keys.

A drawback of GDOI is that the key server itself must be manually configured ahead of time at each group member. A method for dynamically selecting a key server would further help scalability and reliability by allowing any group member to assume the role as key server in the event the exiting key server fails or becomes unavailable. While multicast group leader election protocol exist, any protocol used to dynamically select a key server must be secure. Specifically, such a protocol must guarantee the identity of the key server and the authenticity of messages it sends.

In GDOI, a key server authenticates individual group members using Phase 1 of the Internet Key Exchange protocol, which is described in the Internet Engineering Task Force (IETF) Request for Comments (RFC) 2409. Rather than proceeding to IKE Phase 2, however, GDOI group members enter a registration phase with the key server. At this point, the key server sends common IPSec encryption keys to all group members.

All the group members or potential group members in the network must know the network address of the GDOI key server before the process begins. In situations in which a key server fails, group members may need to elect a new key server from among themselves. To the same end, groups may want to communicate securely on an ad-hoc basis, that is, without the use of a pre-configured key server. However, past approaches have not provided an effective method to choose GDOI servers.

Further, some IP multicast applications are fault tolerant and must not be subject to a single point of failure. Examples of these protocols are IP routing protocols and redundancy protocols. IP routing protocols such as EIGRP and OSPF both use IP multicast to efficiently share routes with other routers on a LAN. If any EIGRP or OSPF router stops communicating with its peer routers on the LAN, the peer routers simply route around the failed router. Redundancy protocols such as HSRP, VRRP, and GLBP all use IP multicast traffic to negotiate which router(s) in a group will respond to queries. If the chosen router stops communicating, one of the other group members will take its place.

In any of these cases, if the network traffic was protected with IPsec keys served from a GDOI key server, and if the GDOI key server is on the failing router, then the group will not be able to operate after current IPsec keys expire. This risk of a GDOI key server providing a single point of failure is an impediment to its usage in these environments.

Prior work has been done in the field of dynamic election protocols. However, past approaches are not secure, and are not provided for the express purpose of choosing a key server. For example, Protocol Independent Multicast (PIM) is an example protocol that uses a leader election process to dynamically elect a Rendezvous Point. Other examples of prior work include:
1. I. Gupta et al., "A Probabilistically Correct Leader Election Protocol for Large Groups," International Symposium on Distributed Computing, 2000;
2. Y. Huang et al., "Group Leader Election under Link-State Routing," Dept. of Comp. Sci., Michigan State Univ., Proceedings of International Conference on Network Protocols;
3. M. Fischer et al., "Impossibility of Distributed Consensus with One Faulty Process," J. Assoc. Comp. Machinery, vol. 32, no. 2, April, 1985, pp. 374-382;
4. T. Kostas et al., "Key Management for Secure Multicast Group Communication in Mobile Networks," DARPA;
5. T. Kostas et al., "A Hierarchical Key Management System for Secure Multicast Group Communications in JTRS," DARPA PTN # 869;
6. S. Vasudevan et al., "Secure Leader Election in Wireless Ad Hoc Networks," University of Massachusetts Computer Science Technical Report 01-50, published 2001.

Gupta et al. devised a group election protocol that worked correctly within a probability constraint. The protocol is too restrictive for GDOI, however, because it requires election participants to have some knowledge of other group members. It also requires each election participant to send some unicast messages to all other group members—this becomes unwieldy when RSA signatures are involved. The paper does reiterate a conclusion reached by Fischer et al. That a probabilistic guarantee of protocol correctness is the best one can reach when at least one process in the group may be faulty. Fischer et al. conclude that complete group consensus is impossible when even one person is faulty. Huang et al. examine group key server election as it applies to routers using link-state routing.

A method of discovering the location of a previously designated server using an IKE R_U_THERE message for "dead peer detection" (DPD) is described in Huang et al., "A Traffic-Based Method of Detecting Dead IKE Peers," Internet-Draft, 2003.

Based on the foregoing, there is a clear need for a method and apparatus for electing a key server in a multicast group.

There is a specific need for a dynamic key server election method that is useful in GDOI multicast groups.

BRIEF DESCRIPTION OF THE DRAWINGS

The present invention is illustrated by way of example, and not by way of limitation, in the figures of the accompanying drawings and in which and in which like reference numerals refer to similar elements and in which.

DETAILED DESCRIPTION OF THE PREFERRED EMBODIMENT

A method and apparatus for electing a leader node in a computer network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
   2.1 Multicast Network Context
   2.2 Foundation Technologies
   2.3 Electing a Leader Node
3.0 Method of Electing a GDOI Key Server Node
   3.1 Process and Protocol
   3.2 Rogue Detection
   3.3 Message Format
   3.4 Security for Message Exchanges
   3.5 Discovering the Key Server
   3.6 User Interface
4.0 Operational Issues that May Be Addressed in Embodiments
5.0 Implementation Mechanisms—Hardware Overview
6.0 Extensions and Alternatives 1.0 General Overview The needs identified in the foregoing Background, and other needs and objects that will become apparent for the following description, are achieved in the present invention, which comprises, in one aspect, a method performed by a first computer node for selecting a leader node to provide service to a plurality of other nodes in a multicast group, wherein each of the nodes communicates using multicast, anycast or broadcast messages, comprises issuing a first election call message; receiving candidacy announcement messages from one or more leader candidate nodes in a specified time period; selecting a victor from among all leader candidate nodes from which candidacy announcement messages are received; receiving one or more victor announcement messages from one or more leader victor nodes for a second specified time period; resolving zero or more collisions among the victor announcement messages to result in selecting the leader node.

According to one feature, the leader node is a key server that provides keys for use in encrypting group messages. According to another feature, the leader node is a GDOI key server that provides keys to nodes according to Group Domain of Interpretation. According to yet another feature, the method further involves performing a coin toss operation that results in either a first result or a second result; and sending a candidacy announcement message in response to the first result occurring, or awaiting the candidacy announcement messages from the one or more leader candidate nodes in response to the second result occurring.

According to one feature, the step of selecting a victor further comprises determining whether the first computer node is the winner, and sending a victor announcement message in response to determining that the first computer node is the winner. According to another feature, the method further involves the step of ignoring any election call messages while awaiting receipt of the one or more candidacy announcement messages.

According to still another feature, selecting a victor comprises selecting one of the leader candidate nodes having a highest network address. According to one feature, resolving any collisions comprises determining that two or more announcement messages have been received; and issuing a second election call message.

In yet another feature, the election call message, candidacy announcement messages, and victor announcement messages are multicast, anycast, or broadcast messages that are received by multiple nodes. According to still another feature, the method further involves receiving, in the first election call message, first identity information specifying a second node that sent the first election call message; pushing the identity information onto a stack; receiving a second election call message that includes second identity information specifying a third node that sent the second election call message; and ignoring the second election call message when the second identity information is found in the stack.

According to one feature, each of the messages comprises a packet type value, sender sequence number value, sender identity value, and a digital signature of a node that sent the message. According to another feature, the method further involves digitally signing each of the messages. In yet another feature, the method further involves creating a sequence number for each message that is sent; digitally signing each message before sending the message; and incrementing the sequence number.

In yet another feature, the step of issuing the first election call message is performed only after failing to receive a reply to a key server discovery message that is multicast, anycast or broadcast by the first node upon newly joining a group. According to one feature, the first node is a member of an ad hoc group.

According to another aspect, the invention provides a method performed by a first computer node for selecting a Group Domain of Interpretation (GDOI) key server to provide key service to a plurality of client nodes in a multicast group, comprising the computer-implemented steps of issuing a first election call message; receiving candidacy announcement messages from one or more leader candidates in a specified time period; selecting a winner from among all leader candidates from which candidacy announcement messages are received; receiving one or more victor announcement messages from one or more leader victor nodes for a second specified time period; resolving zero or more collisions among the victor announcement messages to result in selecting the leader node; wherein the election call message, candidacy announcement messages, and victor announcement messages are multicast, anycast, or broadcast messages.

In other aspects, the invention encompasses a computer apparatus and a computer-readable medium configured to carry out the foregoing steps.

2.0 Structural and Functional Overview 2.1 Multicast Network Context

In general, embodiments of the processes and protocol herein allow a group of network elements to choose a leader from among them. Upon election, a leader is expected to provide a service of some kind. If the leader ever stops providing that service, the remaining group members will choose a new "leader" to take its place.

An example of a service that a leader can provide is the role of a GDOI key server. In this case, a set of redundant group members chooses a leader that will provide that role. It is important that the non-elected group members quickly determine that the elected group member has stopped acting as the key server so that they can elect a replacement without the loss of any network traffic.

According to an embodiment, a dynamic key server election protocol is provided. The protocol herein runs before GDOI runs, choosing a key server for use with GDOI. Messages are secured using digital signatures. For example, RSA signatures, DSS, or certain elliptical curve algorithms can be used.

Although one specific application involves election of GDOI servers, other embodiments may be used to elect other kinds of key servers or other servers. For example, the protocol herein can be used to securely elect any kind of network server from a pool of potential network servers.

Figure 1:
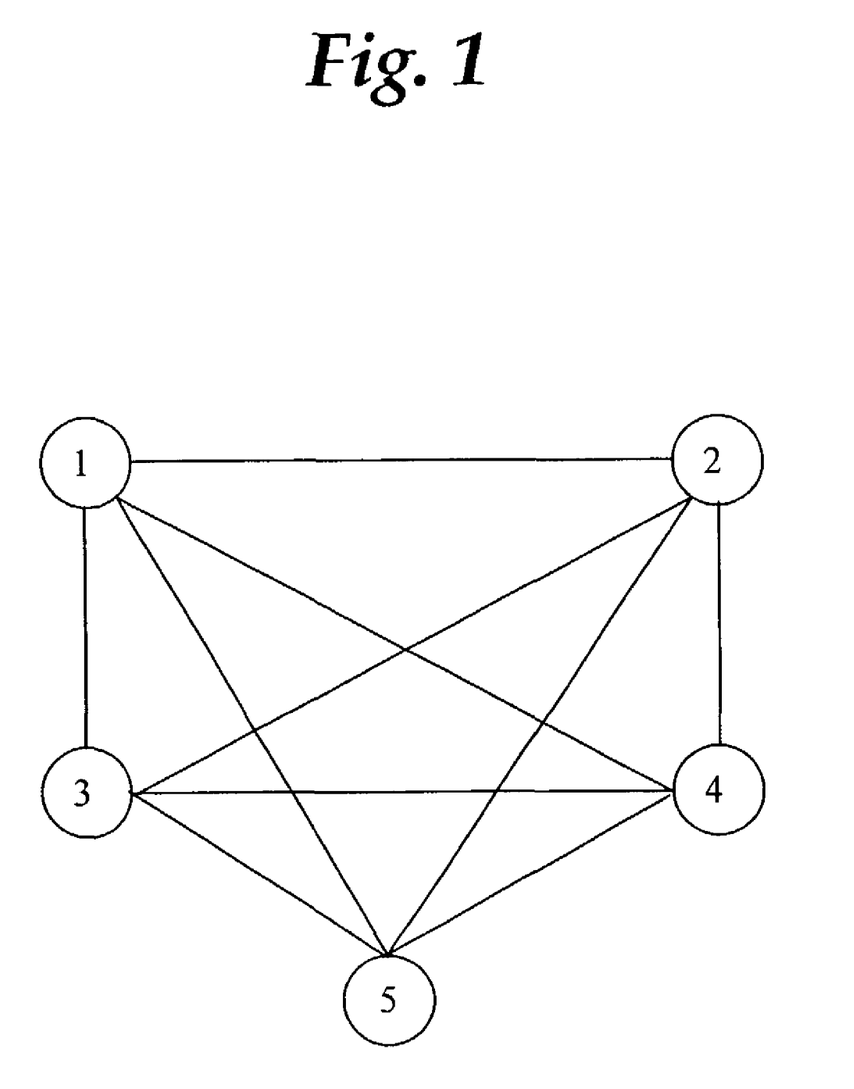
FIG. 1 is a block diagram that illustrates an overview of a multicast network.

FIG. 1 is a block diagram of a multicast group. Group 100 comprises nodes 1, 2, 3, 4, 5. Each of the nodes is communicatively coupled, directly or indirectly through one or more networks, to each other node. Each of the nodes may comprise one or more network elements, including infrastructure elements such as routers, switches, gateways, etc., or end station elements such as computers, workstations, printers, etc. The nodes participate in the multicast group for any appropriate purpose, such as receiving or sending video streams, audio streams, etc. For purposes of illustrating a clear example, the description herein focuses on the use of multicast messages and multicast groups of nodes. However, in IP implementations, anycast or broadcast messages may be used for communication among nodes.

In one embodiment, each of the nodes 1, 2, 3, 4, 5 is capable of serving as a leader node for the multicast group. For example, each of the nodes 1, 2, 3, 4, 5 can serve as a GDOI key server for the group. When one node is elected as leader node, all other nodes issue requests to the leader node for particular services. For example, when the elected nodes is a GDOI key server for the group, the elected node generates and distributes keys as provided in the GDOI protocol and related protocols to the other nodes.

2.2 Foundation Technologies

IPSsec provides data authentication and privacy at the IP layer for data packets. IPSec is already widely deployed for unicast traffic. IPSec uses symmetric encryption, and therefore entities using IPSec to encrypt packets must share a common key. Statically configured keys or manual keys are possible, but ill favored, since they lack scalability. Using manual keys can also be a security risk, since the indefinite reuse of encryption keys allows more possibilities for active attacks. Moreover, IPSec only protects data packets; for end-to-end security, the communicating peers must be authenticated.

To address these issues, IPSec implementations often interoperate with a separate key management protocol called the Internet Key Exchange (IKE), as described in Harkins, D. and Carrel, D., "The Internet Key Exchange," IETF RFC 2409, 1998. IKE can be used to authenticate two communicating peers and to perform key exchange and management for IPSec. IKE accomplishes these functions within a packet framework defined by the Internet Security Association Key Management Protocol (ISAKMP), which is described in Maughan, D.; Schertler, M.; Schneider, M.; and Turner, J. "Internet Security Association Key Management Protocol (ISAKMP)," IETF RFC-2407, 1998. GDOI also leverages the framework defined by ISAKMP.

Generally, IKE is effective in performing bidirectional authentication and key generation. However, the limitation of IKE to peer-to-peer communication makes IKE unsuitable for multicast security, in which two or more entities must be authenticated and must share the same IPSec encryption keys.

The functions of IKE translate roughly into two phases. Phase 1 performs peer-to-peer authentication as well as raw key generation via a Diffie-Hellman exchange. Diffie-Hellman key exchange is described in Rescola, E., "Diffie-Hellman Key Agreement Method," IETF RFC 2631, 1999. The raw key, called the SKEYID, is used in Phase 2 of IKE to generate the actual encryption keys for IPSec. The Phase 2 exchange is completely encrypted and authenticated via the keying material generated in Phase 1. As the next section describes, GDOI reuses Phase 1 of IKE to authenticate a group member with the key server.

GDOI was designed to address the need to authenticate nodes and create encryption keys shared by a group. GDOI is intended to secure both one-to-many and many-to-many group scenarios, and GDOI accomplishes key generation by way of a centralized key server. Because GDOI reuses ISAKMP, and because GDOI is meant to coexist with IKE, GDOI performs the authentication step by reusing the IKE authentication method. However, rather than authenticating peer-to-peer, as IKE does, GDOI authenticates group members to the key server, and vice-versa. To this end, each group member performs a Phase 1 negotiation with the key server on a peer-to-peer basis. In terms of GDOI, the Phase 1 negotiation authenticates the group member to the key server, and the key server to the group member. GDOI achieves authentication amongst group members implicitly through the shared trust of the key server.

Once the authentication step is performed, a group member performs the registration phase of GDOI. The registration phase of GDOI replaces IKE Phase 2 completely, and is encrypted and authenticated with the keying material generated in the first phase. During the registration phase, the group member requests to join the group, and then the group member and the key server agree upon policy attributes such as encryption algorithms, key lifetimes, etc. The last step of the phase is for the key server to push the IPSec encryption keys to the member; this is the same keying material that the key server sends to all members of this group.

An assumption of GDOI is that the network address of the key server is known. While this is often the case, it wold be useful if group members could choose the group key server dynamically. For example, in redundancy scenarios in which the principal key server fails, group members should be able to choose a new key server from among group members. Further, an ad-hoc group that wishes to communicate securely, but has not been preconfigured with a key server, should be able to select a key server.

2.3 Electing a Leader Node

Figure 2:
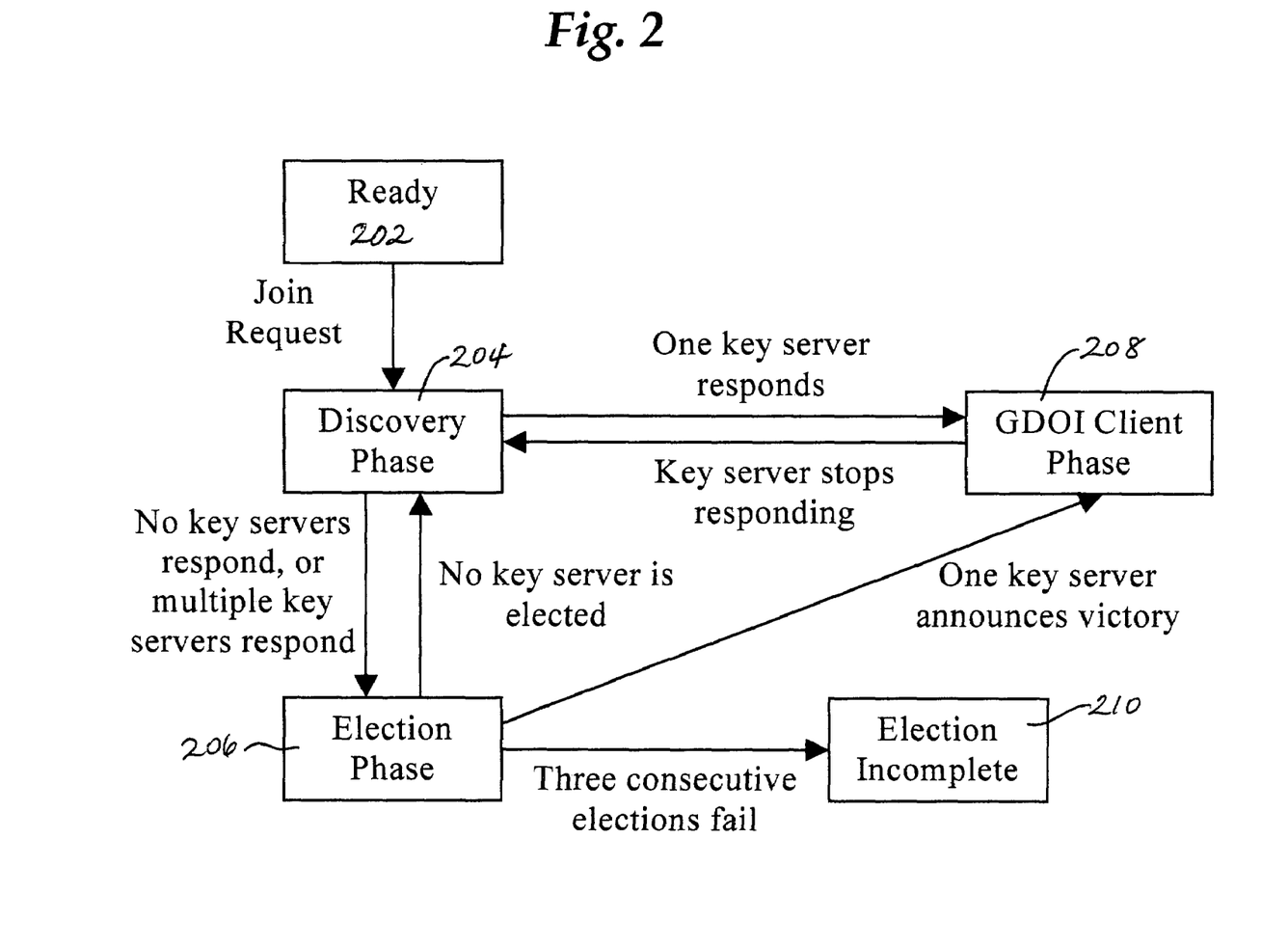
FIG. 2 is a block diagram that illustrates an operating context for a method of electing a server.
Figure 3:
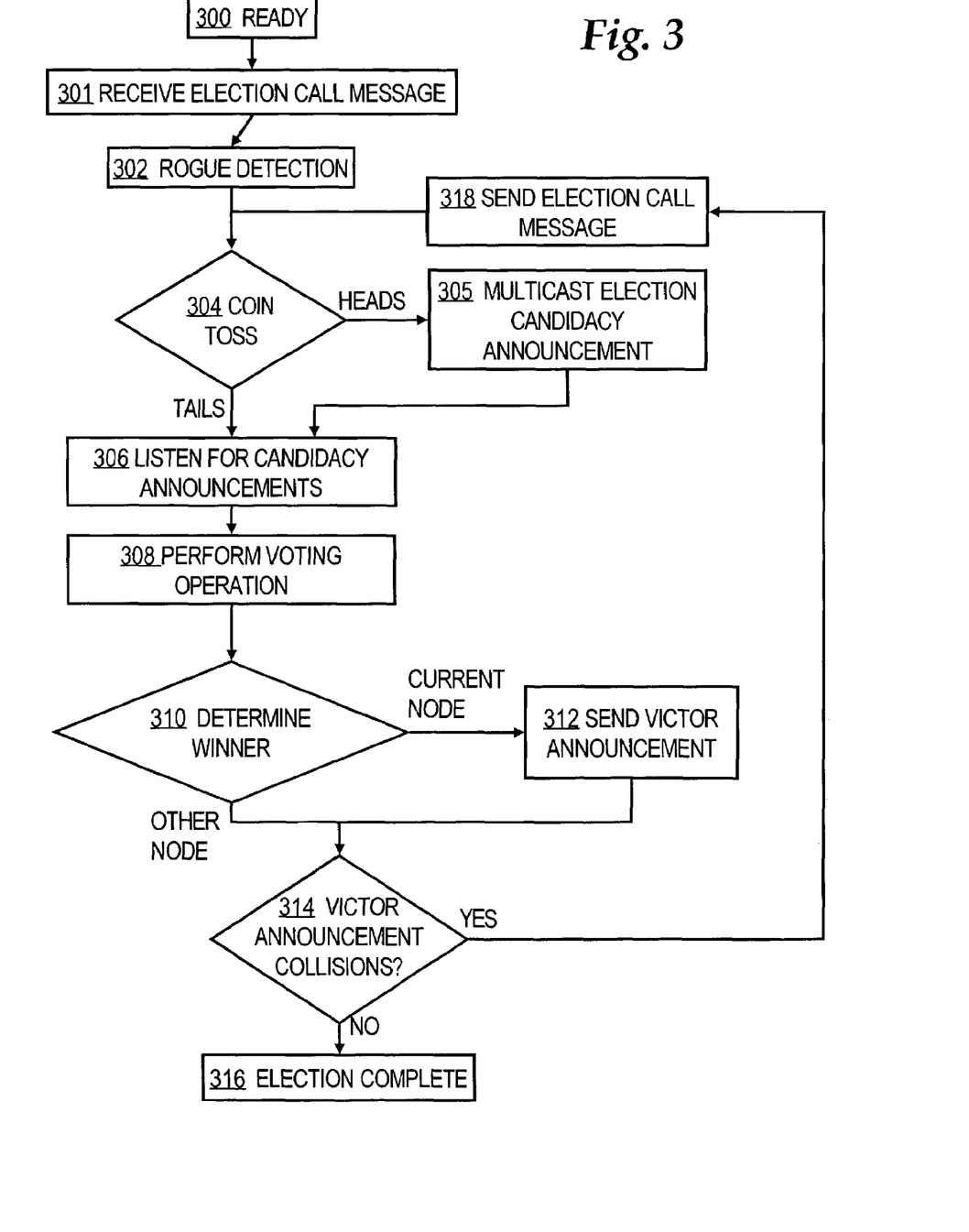
FIG. 3 is a flow diagram illustrating a high-level view of one embodiment of a method of electing a leader node.
Figure 4:
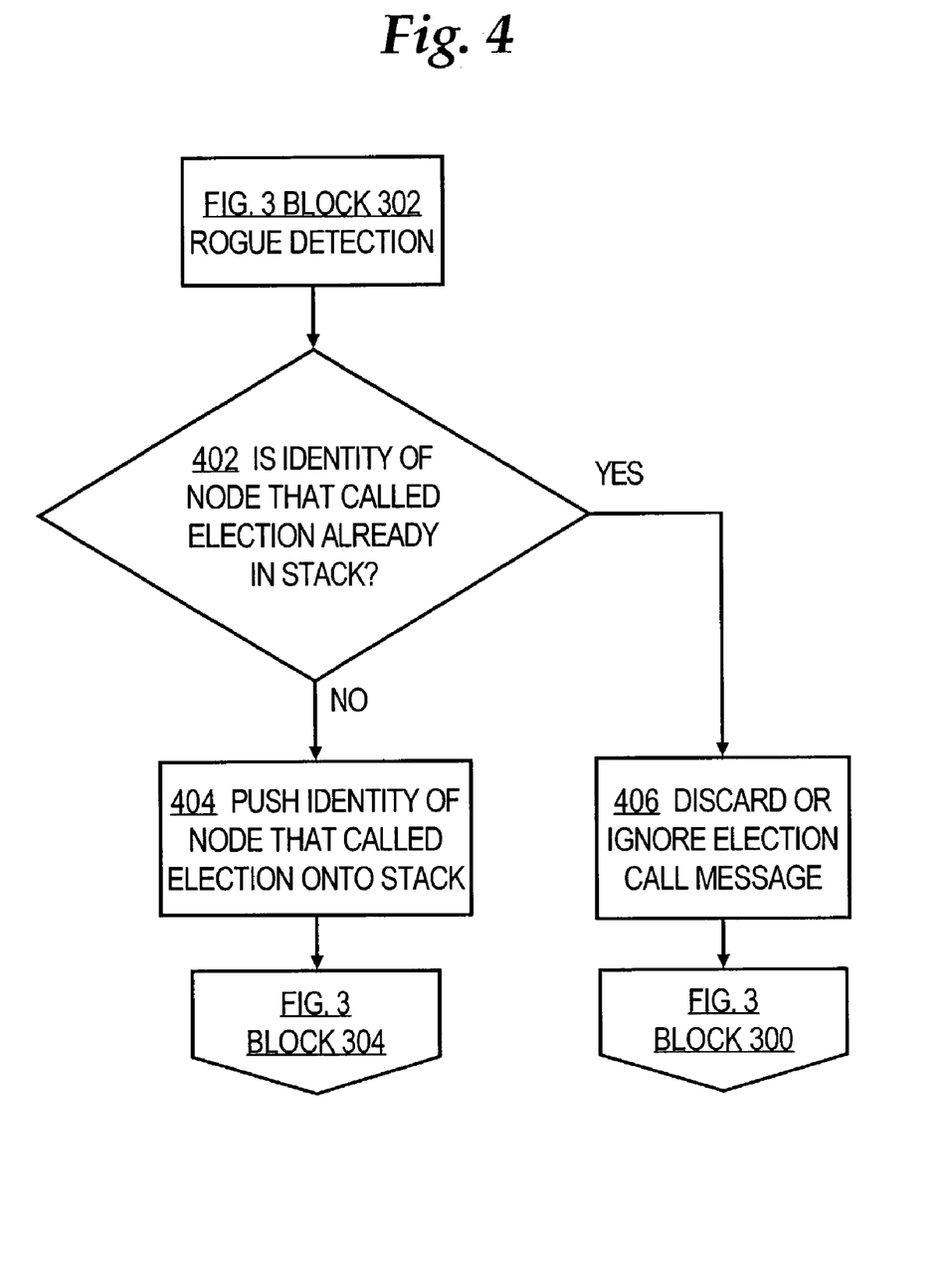
FIG. 4 is a flow diagram of steps in a rogue detection process.

FIG. 2 is a block diagram that illustrates an operating context for a method of electing a GDOI key server. The process of FIG. 2 may be implemented using software that is executed by nodes such as those described above with respect to FIG. 1. Such an implementation may define a protocol that involves a series of multicast, anycast or broadcast messages and a distributed voting approach that is executed at each node. In the description of FIG. 2, FIG. 3, FIG. 4 herein, each term referring to sending data (e.g., "send," "transmit," etc.) means "send via multicast, anycast or broadcast."

Initially, a node in a network, such as nodes 1, 2, 3, 4, 5 of FIG. 1, operates in Ready state 202. If a group member finds that it needs to contact a GDOI key server for a particular group but it does note know whom to contact, then it must discover the key server. For example, upon performing a successful request to join a multicast group, the node enters Discovery phase 204, in which the node attempts to discover an existing key server.

Discovery may involve sending query messages to all nodes in the group requesting the key server node to identify itself. Alternatively, the node can wait for the key server to issue an announcement message. For example, a LEADER_R_U_THERE message is sent by the group member, which then waits for a response. If a response is received within a certain window of time, and if the group member can authenticate and authorize the sender, the group member then immediately proceeds to the GDOI Client exchange. If the group member gets no response, then it proceeds to the election phase.

As shown in FIG. 2, if the Discovery phase results in one key server responding, then the node transitions to GDOI Client Phase 208, in which the node acts as a client of the key server. If the key server stops responding to key service requests while the node is in GDOI Client Phase 208, then the node transitions back to Discovery Phase 204.

If the Discovery phase results in no key servers responding, or if multiple key servers respond, then the node transitions to Election Phase 206. The election protocol described further herein may be used. As a result, either no key server is elected, one key server announces victory in the election, or a plurality of elections fail. If no key server is elected, then the node transitions to the Discovery Phase 204. If one key server announces victory in the election then the node transitions to GDOI Client Phase 208. If a plurality of elections fail, then the node transitions to Election Incomplete state 210.

In one specific embodiment, a group member calls an election by sending an ELECTION_CALL message to the group. If the group member calling the election is a candidate key server, then the group member always sends an ELECTION_CANDIDACY message rather than performing a coin flip operation. This ensures that there is at least one potential winner of the election. If the group member wins the election, it generates keys for the group, installs them in its own client code, and prepares to receive requests from GDOI clients. Further details of an example election procedure are provided in the next section.

If the group member calling the election is not a candidate key server, it simply waits for a VICTOR_ANNOUNCEMENT message. Several situations can occur.

First, if the group member receives no victory announcements, it calls an election again, up to a total of a specified number of election attempts. For example, three election attempts can be made. If no key server announces victory after the specified number of election attempts, then the group member returns a failure to the application that called it. Second, if the group member receives just one victory announcement, it proceeds to the GDOI Client exchange. Third, if the group member receives multiple victor announcements, it discards the victor announcement and calls another round of elections.

In one embodiment, in GDOI client Phase 208, group members initiate a GDOI registration protocol to the elected GDOI key server. The registration protocol proceeds according to the GDOI protocol. If the registration protocol does not succeed, the group member reverts to the Discovery Phase 204 in order to re-establish whether or not the elected key server is operational or accessible.

If the initial registration protocol succeeds, the group member will install the IPsec Security Associations (SAs) that are managed by the GDOI key server. Later, if the IPsec SAs are about to expire and a GDOI rekey message has not been received containing replacement SAs, the group member attempts to re-register with the GDOI key server. That action will happen in any case. In the case of a dynamic GDOI key server, if the re-registration fails the group member reverts to the Discovery Phase 204 in order to establish whether the elected GDOI key server is available or not.

3.0 Method of Dynamically Electing a GDOI Key Server 3.1 Process and Protocol

FIG. 3 is a flow diagram illustrating a high-level view of one embodiment of a method of electing a leader node. The procedure of FIG. 3 may be used at Election Phase 206 of FIG. 2, or in any situation in which a network needs to elect a leader node or leader server. FIG. 3 is intended to represent steps performed by a first node, such as any of the nodes of FIG. 1, that needs to elect a leader node, as opposed to steps that are performed by an elected leader node.

For reliability, elections should be called only when absolutely necessary. Examples of events that may cause an election to be called, in a GDOI key server election implementation, include: When a group member joins a group, and no key server is found in the Discovery Phase 204 of FIG. 2; when an election is called and any group member receives more than one VICTOR_ANNOUNCEMENT message; and any time that the GDOI group member cannot establish contact with the elected key server, after reverting to the Discovery Phase.

A first node, e.g., any of nodes 1, 2, 3, 4, 5 of FIG. 1, initiates the process of FIG. 3 at block 300. In block 301, the first node receives a message calling for an election from some other node. For clarity, specific reasons to call an election are described elsewhere herein.

In block 302, the first node performs a rogue detection process. The rogue detection process identifies spurious or spoofed election call messages, or messages from nodes that have already sent an election call message in a lossy network. An example of a rogue detection process is described further herein with respect to FIG. 4.

In block 304, the first node and all other nodes that receive the message perform a coin toss operation. For example, a random value may be generated and normalized to yield a value of either "0" or "1." Nodes for which the coin toss operation results in a "heads" result then announce their candidacy to be the group leader, by sending a candidacy message, as shown by block 305.

The purpose of performing the coin toss and sending the candidacy message is to reduce the number of election participants. Reducing the number of election participants improves scalability because cryptographic operations are expensive operations, but necessary to validate candidacy announcements. Similarly, the protocol herein also attempts to minimize the number of messages that nodes must process. While all nodes could conceivably reach a "tails" result in the coin toss process, resulting in no election candidates, the protocol itself will not deadlock; the nodes simply time out and call for a new election. The process can continue until a victor is chosen.

In block 306, all nodes proceed to a "listen" phase in which they listen for candidacy announcements. Thus, once the nodes receive the initial election call message, the nodes wait a predetermined amount of time before proceeding to the voting round of the protocol. During this round, nodes ignore any new incoming calls for election.

In block 308, at the end of the "listen" phase, all nodes perform a voting operation. In one embodiment, at each node, the candidate node with the highest address wins the voting. Thus, all nodes perform the same voting operation and all nodes will have the same winner.

Nodes then wait a predetermined amount of time for the vote round to finish; at the end of the round, nodes proceed to the victory probation round, where they detect victory collisions. In one embodiment, at block 310, the first node determines whether it is the winner of the voting process. If so, then the first node sends a victor announcement message, as shown in block 312. If not, then the first node waits to receive a victor announcement message from another node. Thus, all nodes enter a "victor probation" phase in which the winning candidate node sends a victory announcement, while other nodes listen. If no packet loss occurred in the preceding messages, then the victor is the only node that sends the victory announcement.

However, if packet loss occurred, then it is possible that multiple nodes and victory announcements. Therefore, in block 314, the first node tests whether victor announcement collisions occurred, i.e., whether the first node received multiple victor announcement messages. Any node that detects such a victory collision immediately calls for a new election, as indicated by block 318. The call for a new election is another election call message; therefore, other nodes will also receive the message. Nodes receiving an election call message suppress any election call announcements of their own. The preceding process continues until a victor is chosen.

3.2 Rogue Detection

The processes and protocol herein address a specific threat model in the key server election process. The processes and protocol herein can authenticate election participants using a public key algorithm. The protocol assumes that any peer with a valid public key is authorized to take part in the election protocol, and does not address active attackers with a valid key. Thus, generally, the protocol does not completely protect against a rogue member with a valid key that purposefully tries to sabotage the election process. However, certain safeguards against attack can be provided.

FIG. 4 is a flow diagram of steps in a rogue detection process. The rogue detection process enables the protocol herein to protect against rouge nodes. In this context, rogue nodes are nodes that can successfully send election calls, but not receive victory announcements. The process of FIG. 4 is invoked when an election call message is received at block 302 of FIG. 3.

In block 402, the receiving node determines whether the identity of the node that called the election is already in a rogue detection stack. If not, then the identity of the node that called the election is pushed onto the stack, in block 404, and control returns to block 304 of FIG. 3. However, if the node that called the election is already in the stack, then in block 406 the election call message is discarded or ignored, and control returns to block 300 of FIG. 3.

The stack may have as few as two elements. Thus, in one embodiment, each time a node calls for an election, its address is pushed onto a two-element stack. On receiving subsequent election calls, nodes check the identity of the election initiator against the addresses in the stack. If the caller appears in the stack, the election call is discarded.

3.3 Message Format

According to one embodiment, each message in the protocol described herein comprises a Packet Type field, Sender Sequence Number field, Sender Identity field, and Packet Signature field. In a practical implementation, certain parameters such as packet size, field offsets, etc. may be specified. Table 1 identifies the contents of the field of messages:

TABLE 1

MESSAGE FIELDS

| | |
|---|---|
| Packet Type | Specifies the type of message the current packet signifies. In one embodiment, the Packet Type field can have the following values: ELECTION_PACKET_CALL; ELECTION_PACKET_CANDIDACY, ELECTION_PACKET_VICTORY, LEADER_R_U_THERE, LEADER_R_U_THERE_ACK |
| Sender Sequence Number | Represents the current sequence number that the receiver expects to receive from the sender. |
| Sender Identity | Specifies the identity of the source of the packet. A receiving node uses this identity to search for the public key with which it verifies the signature. |
| Packet Signature | Digital signature created by signing the packet with the sender's private key. |

Other embodiments may use additional fields, or different definitions of the foregoing fields.

3.4 Security for Message Exchanges

According to one embodiment, the processes and protocol herein are made secure by requiring each node to verify a received message cryptographically. In one embodiment, the processes and protocol herein use RSA signatures to verify the authenticity of messages. RSA signatures are described in Rivest, et al., "A Method for Obtaining Digital Signatures and Public-Key Cryptosystems," *Communications of the ACM*, Vol. 21, No. 2, February 1978, pp. 120-126.

A public key algorithm such as RSA is used so that each node in the group has its own public-private key pair. Each participant's public key is distributed to every other node out-of-band, and this distribution need occur only once. Alternatively, a group pre-shared key or a group password is used, which simplifies configuration and deployment. However, use of a group password does not provide pre-node authentication, as a single password is used for all members in the group. This authentication model is considerably weaker than the one provided by using RSA signatures.

The threat model addressed by the process and protocol herein does not consider election secrecy to be important, because the identity of the group key server does not need to be secret. Moreover, an attacker can gain this knowledge by analysis of traffic patterns once GDOI begins; indeed, the key server will be the node doing all the IKE Phase 1 negotiations with the other nodes. Therefore, verifying the identity of each candidate is one requirement. Another requirement is for each message in the protocol to be authenticated.

In one embodiment, the RSA signature algorithm is used to secure messages. A sender creates hash of each packet. The hash may be created using SHA-1, which is described by Eastlake, D. and Jones, P. "US Secure Hash Algorithm 1 (SHA1)," IETF RFC 3174, 2001, or a similar message digest algorithm that yields a fixed-length hash. The sender then encrypts the hash with the encryption algorithm, using the sender's private key to sign each packet. The sender increments its sequence number after each packet it sends.

Receivers authenticate the packet by verifying the signature and checking that the sequence number is greater than or equal to the current sequence number it expects for the given peer. A receiver always accepts the sequence number for the initial message it receives from a peer. The processes and protocol herein use the sequence number to ensure that attackers do not capture and replay previous election packets.

While the RSA algorithm is a computationally expensive operation, the processes and protocol herein minimize overhead, because there are relatively few packets in each voting round and the number of candidates is reduced by the coin toss.

3.5 Discovering the Key Server

According to one embodiment, newly joining members discover the current key server, without having to call for a new election, by initiating a query on an as-needed basis. For instance, new members send a LEADER_R_U_THERE message. In one embodiment, the message is multicast, because the new group member knows only that the key server is a member of the multicast group. The group key server, upon receiving this message, responds by sending a LEADER_R_U_THERE_ACK message. Both messages may be signed, but only the group key server needs to verify the LEADER_R_U_THERE message; all other group members can simply discard the message.

Upon sending the query, the new group member starts a retransmission timer. If the new group member fails to receive a response before the timer expires, the new group member retransmits a specified number of times before deciding that the key server is unreachable. In one embodiment, the number of retransmits times is three. At this point, the new member can call a new election.

Another use for the LEADER_R_U_THERE message is to query the liveliness of the group key server, which is useful in the case of periodic rekeying under GDOI, during which communication between group members and the key server occurs. If the key server fails to respond to any messages from a particular member, that member can initiate a query using the LEADER_R_U_THERE message. If the key server fails to respond to this message, the member can assume it is unreachable and call a new election.

3.6 User Interface

According to one embodiment, an administrator or network management application may configure group members that are authorized to be key severs, and group members that are not authorized to be key servers using the configuration interface of a network device. In one embodiment, configuration is performed by issuing command-line interface (CLI) commands to the operating system of a network device that represents or is hosting the group member.

For example, when network devices from Cisco Systems, Inc. running IOS® Software are used as group members, the group members that are authorized to become key servers have the full group policy configured in the IOS CLI. Typically, although not necessarily, each candidate key server would have the same policy.

The declaration of a key server as a candidate key server is enabled with a single "election" keyword that is added to the existing group policy configuration. In the example of Table 2, a group member is configured to be group member as well as a candidate key server. The "crypto map" configuration is the group member configuration. The "crypto gdoi group" configuration with a server type of "local" defines the device to be a candidate key server.

TABLE 2

CONFIGURATION OF CANDIDATE KEY SERVER crypto gdoi group <group name>
  group number <group id>
  server election <IP multicast address>
  server local
    rekey authentication mypubkey rsa <RSA keypair name>
    rekey address <ACL number>
    sa ipsec <sequence number>
      profile <ipsec profile name>
      match address <ACL number>
crypto map <map tag> <sequence number> ipsec-gdoi
  set group <group id>
  match address <ACL number>
interface <interface name>
  crypto map <map tag>

The "server election" keywords indicate that the key server must not use its "server local" configuration unless it has been elected as the key server. Configuration commands for identifying authorized key servers is not provided in this example or the example of Table 3.

Group members that are not authorized to be GDOI key servers do need to locate the key server, and potentially cause an election to occur if they need to join the group. Locating a key server is also enabled with a single keyword that is added to the existing group policy configuration, as shown in Table 3.

TABLE 3

CONFIGURATION FOR GROUP MEMBERS THAT ARE NOT AUTHORIZED TO BE KEY SERVERS crypto gdoi group <group name>
  group number <group id>
  server election <IP multicast address>
crypto map <map tag> <sequence number> ipsec-gdoi
  set group <group id>
  match address <ACL number>
interface <interface name>
  crypto map <map tag>

When the "server election" keywords are present without any other server specification, the IOS device knows that all it can do is call an election, and wait for a victor announcement to preceed with the GDOI client protocol.

4.0 Operational Issues That May Be Addressed In Mplementations

The protocol herein provides a way to securely choose group leaders. Further, the protocol herein is believed to be the only protocol that can dynamically choose GDOI key servers. In a GDOI implementation, the protocol is secure and chooses a single server (e.g., GDOI key server) from a group of potential servers.

The protocol herein can be implemented in any GDOI implementation. The protocol herein can be used for failover scenarios of GDOI key servers, when GDOI key servers are used to provide keys for network protocols. This is especially necessary when a GDOI key server is providing keys for applications that must not have a single point of failure. For example, when GDOI is used to provide keys for hot standby protocols that use IP multicast to communicate, such as HSRP, VRRP, and GLBP. Also, the protocol herein is effective when GDOI is used to provide keys that protect routing packets that are multicast on an LAN, using protocols such as EIGRP, OSFP, and PIM. Use of the protocol herein allows these protocols to continue encrypting packets in a non-stop fashion even when the key server servicing the group becomes unavailable.

When implementations of the process or protocol are used to provide a dynamic GDOI key server, several different kinds of security requirements can and should be satisfied. With respect to authentication, the key server messages must be verifiable as being sent from a legitimate potential key server. For efficiency, they should be authenticated with keys that fit into the ISAKMP authentication framework, such as pre-shared secret keys, pre-shared RSA public keys, or PKI certificates containing RSA public keys. Use of public keys is best because it provides true source origin authentication. However, for some applications the use of a group pre-shared secret key may be sufficient to prove that the messages were sent by a valid group member.

To enforce authorization, each group member should be aware of which network devices are authorized to be potential key servers. To provide replay protection, messages in the protocol herein contain a monotonically increasing sequence number. An application is expected to examine the sequence number and determine whether replay has occurred. In one implementation, each potential key server has a replay counter.

Implementations also provide mechanisms for addressing imperfect network stability. Elections tend to work flawlessly if no messages are dropped. The process and protocol herein addresses with lost ELECTION_CANDIDACY messages. If a group member receives multiple VICTOR_ANNOUNCE-MENT messages, then the group member concludes that at least one member missed an ELECTION_CANDIDACY message, and thus calls a new election.

However, a lossy network may well result in the new election to be missed by the group member, and/or the next election may again result in a dropped ELECTION_CANDI-DACY message. An implementation of a dynamic GDOI Key Server implementation should attempt to catch as many of these cases as possible.

The election process described herein does not guarantee a "fair" election, in which any candidate key server has an equal chance of election as a key server. "Fairness" is traded for reliability in several ways. For example, if a candidate key server calls an election, it is more reliable if that candidate key server always announces a candidacy in order to ensure that there will always be at least one candidate.

Further, the candidate with the highest network address will always win. This simple heuristic saves more complex processing, although it could cause a problem if the candidate key server with the highest address is not able to handle the load of being the group key server. However, an administrator must explicitly configure a group member to be a candidate key server; a group member cannot automatically become a candidate key server. The group administrator is responsible to verify that all candidate key servers can withstand the load of being a key server.

5.0 Implementation Mechanisms—Hardware Overview

Figure 5:
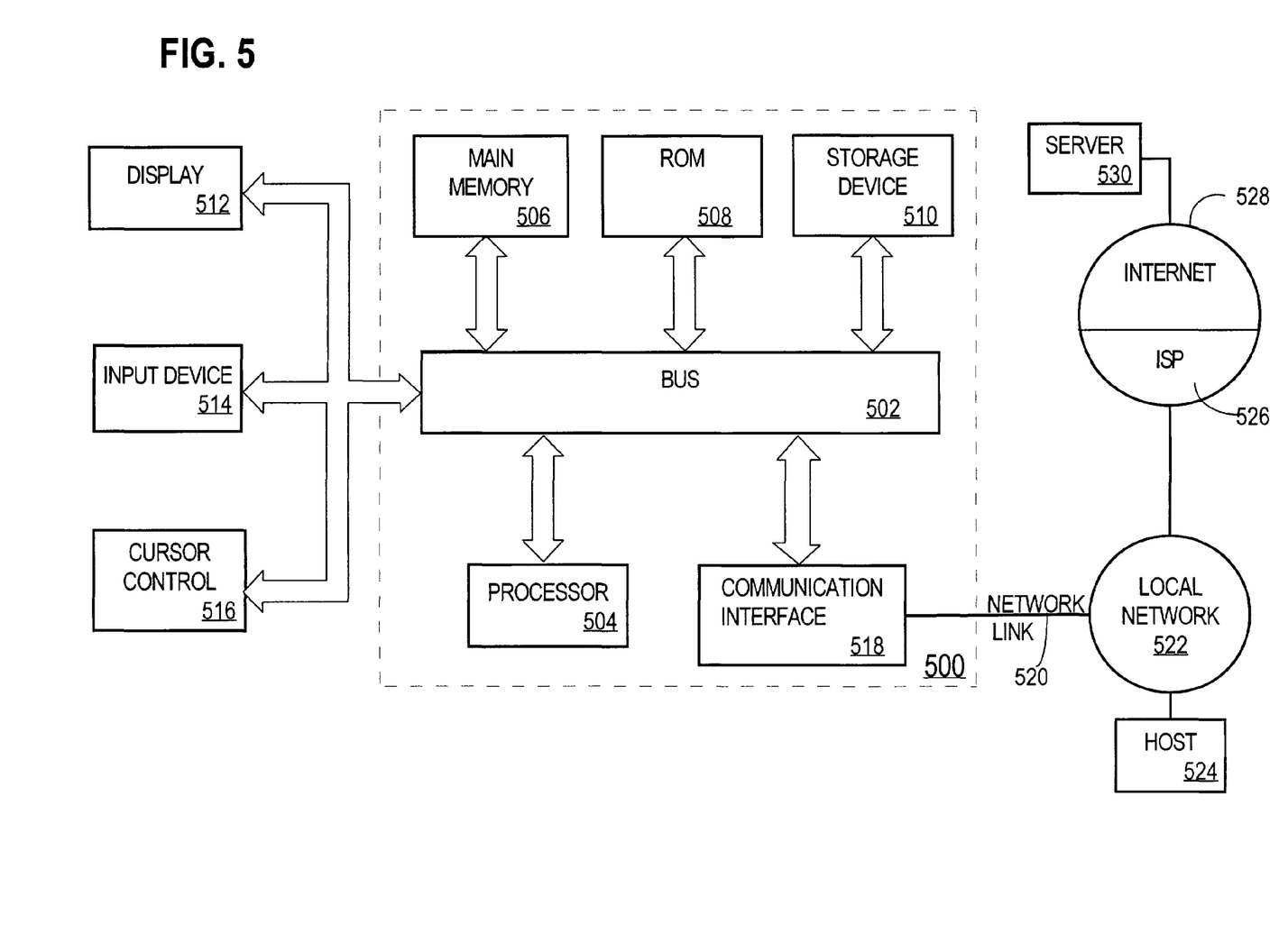
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for electing a leader node in a computer network. According to one embodiment of the invention, electing a leader node in a computer network is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alterative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network line 520 and communication interface 518. In the Internet example, a server 530 might transmit a requested code for an application program through Internet 528, ISP 526, local network 522 and communication interface 518. In accordance with the invention, one such downloaded application provides for electing a leader node in a computer network as described herein.

Processor 504 may execute the received code as it is received, and/or stored in storage device 510, or other non-volatile storage for later execution. In this manner, computer system 500 may obtain application code in the form of a carrier wave.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method performed by a first computer node for selecting a leader node to provide service to a plurality of other nodes in a multicast group, wherein each of the nodes communicates using multicast, broadcast or anycast messages, the method comprising the computer-implemented steps of:
   issuing a first election call message;
   receiving candidacy announcement messages from one or more leader candidate nodes in a specified time period;
   selecting a victor from among all leader candidate nodes from which candidacy announcement messages are received;
   receiving one or more victor announcement messages from one or more leader victor nodes for a second specified time period;
   resolving zero or more collisions among the victor announcement messages to result in selecting the leader node;
   receiving, in the first election call message, first identity information specifying a second node that sent the first election call message;
   pushing the identity information onto a stack;
   receiving a second election call message that includes second identity information specifying a third node that sent the second election call message; and
   ignoring the second election call message when the second identity information is found in the stack.

2. A method as recited in claim 1, wherein the leader node is a key server that provides keys for use in encrypting multicast group messages.

3. A method as recited in claim 1, wherein the leader node is a GDOI key server that provides keys to nodes according to Group Domain of Interpretation.

4. A method as recited in claim 1, further comprising:
   performing a coin toss operation that results in either a first result or a second result; and
   sending a candidacy announcement message in response to the first result occurring, or awaiting the candidacy announcement messages from the one or more leader candidate nodes in response to the second result occurring.

5. A method as recited in claim 1, wherein the step of selecting a victor further comprises the steps of:
   determining whether the first computer node is the winner; and
   sending a victor announcement message in response to determining that the first computer node is the winner.

6. A method as recited in claim 1, further comprising the step of ignoring any election call messages while awaiting receipt of the one or more candidacy announcement messages.

7. A method ad recited in claim 1, wherein selecting a victor comprises selecting one of the leader candidate nodes having a highest network address.

8. A method as recited in claim 1, wherein resolving any collisions comprises:
   determining that two or more announcement messages have been received; and
   issuing a second election call message.

9. A method as recited in claim 1, wherein the election call message, candidacy announcement messages, and victor announcement messages are multicast, broadcast or anycast messages.

10. A method as recited in claim 1, wherein each of the messages comprises a packet type value, sender sequence number value, sender identity value, and a digital signature of a node that sent the message.

11. A method as recited in claim 1, further comprising digitally signing each of the messages.

12. A method as recited in claim 1, further comprising the steps of:
creating a sequence number for each message that is sent;
digitally signing each message before sending the message; and
incrementing the sequence number.

13. A method as recited in claim 1, wherein the step of issuing the first election call message is performed only after failing to receive a reply to a key server discovery message that is sent by the first node upon newly joining a multicast group.

14. A method as recited in claim 1, wherein the first node is a member of an ad hoc multicast group.

15. A method performed by a first computer node for selecting a Group Domain of Interpretation (GDOI) key server to provide key service to a plurality of client nodes in a multicast group, the method comprising the computer-implemented steps of:
issuing a first election call message;
receiving candidacy announcement messages from one or more leader candidates in a specified time period;
selecting a winner from among all leader candidates from which candidacy announcement messages are received;
receiving one or more victor announcement messages from one or more leader victor nodes for a second specified time period;
resolving zero or more collisions among the victor announcement messages to result in selecting the leader node;
receiving, in the first election call message, first identity information, specifying a second node that sent the first election call message;
pushing the identity information onto a stack;
receiving a second election call message that includes second identity information specifying a third node that sent the second election call message; and
ignoring the second election call message when the second identity information is found in the stack;
wherein the election call message, candidacy announcement messages, and victor announcement messages are multicast, broadcast or anycast messages.

16. A method as recited in claim 15, wherein the step of issuing the first election call message is performed only after failing to receive a reply to a key server discovery message that is sent by the first node upon newly joining a multicast group.

17. A method as recited in claim 15, further comprising:
performing a coin toss operation that results in either a first result or a second result; and
sending a candidacy announcement message in response to the first results occurring, or awaiting the candidacy announcement messages from the one or more leader candidates in response to the second result occurring.

18. A method as recited in claim 15, wherein the step of selecting a winner further comprises the steps of:
determining whether the first computer node is the winner; and
sending a victor announcement message in response to determining that the first computer node is the winner.

19. A method as recited in claim 15, further comprising the step of ignoring any election call messages while awaiting receipt of the one or more candidacy announcement messages.

20. A method as recited in claim 15, wherein selecting a winner comprises selecting one of the leader candidates having a highest network address.

21. A method as recited in claim 15, wherein resolving any collisions comprises:
determining that two or more announcement messages have been received; and
issuing a second election call message.

22. A method as recited in claim 15, wherein each of the messages comprises a packet type value, sender sequence number value, sender identity value, and a digital signature of a node that sent the message.

23. A method as recited in claim 1, further comprising the steps of:
creating a sequence number for each message that is sent;
digitally signing each message before sending the message; and
incrementing the sequence number.

24. A method as recited in claim 1, wherein the first node is a member of an ad hoc multicast group.

25. A computer-readable storage device or disk medium carrying one or more sequences of instructions for a first computer node for selecting a leader node to provide service to a plurality of other nodes in a multicast group, wherein each of the nodes communicates using multicast, broadcast or anycast messages, which instructions, when executed by one or more processors, cause the one or more processors to carry out the steps of:
issuing a first election call message;
receiving candidacy announcement messages from one or more leader candidate nodes in a specified time period;
selecting a victor from among all leader candidate nodes from which candidacy announcement messages are received;
receiving one or more victor announcement messages from one or more leader victor nodes for a second specified time period;
resolving zero or more collisions among the victor announcement messages to result in selecting the leader node;
receiving, in the first election call message, first identity information specifying a second node that sent the first election call message;
pushing the identity information onto a stack;
receiving a second election call message that includes second identity information specifying a third node that sent the second election call message; and
ignoring the second election call message when the second identity information is found in the stack.

26. A computer-readable storage device or disk medium as recited in claim 25, wherein the leader node is a key server that provides keys for use in encrypting multicast group messages.

27. A computer-readable storage device or disk medium as recited in claim 25, wherein the leader node is a GDOI key server that provides keys to nodes according to Group Domain of Interpretation.

28. A computer-readable storage device or disk medium as recited in claim 25, further comprising instructions for:
performing a coin toss operation that results in either a first result or a second result; and sending a candidacy announcement message in response to the first results occurring, or awaiting the candidacy announcement messages from the one or more leader candidate nodes in response to the second result occurring.

29. A computer-readable storage device or disk medium as recited in claim 25, wherein the instructions for the step of selecting a victor further comprise instructions for the steps of:
determining whether the first computer node is the winner; and
sending a victor announcement message in response to determining that the first computer node is the winner.

30. A computer-readable storage device or disk medium as recited in claim 25, further comprising instructions for the step of ignoring any election call messages while awaiting receipt of the one or more candidacy announcement messages.

31. A computer-readable storage device or disk medium as recited in claim 25, wherein selecting a victor comprises selecting one of the leader candidate nodes having a highest network address.

32. A computer-readable storage device or disk medium as recited in claim 25, wherein resolving any collisions comprises:
determining that two or more announcement messages have been received; and
issuing a second election call message.

33. A computer-readable storage device or disk medium as recited in claim 25, wherein the election call message, candidacy announcement messages, and victor announcement messages are multicast, broadcast or anycast messages.

34. A computer-readable storage device or disk medium as recited in claim 25, wherein each of the messages comprise a packet type value, sender sequence number value, sender identity value, and a digital signature of a node that sent the message.

35. A computer-readable storage device or disk medium as recited in claim 25, further comprising digitally signing each of the messages.

36. A computer-readable storage device or disk medium as recited in claim 25, further comprising instructions for the steps of:
creating a sequence number for each message that is sent;
digitally signing each message before sending the message; and
incrementing the sequence number.

37. A computer-readable storage device or disk medium as recited in claim 25, wherein the step of issuing the first election call message is performed only after failing to receive a reply to a key server discovery message that is sent by the first node upon newly joining a multicast group.

38. A computer-readable storage device or disk medium as recited in claim 25, wherein the first node is a member of an ad hoc multicast group.

39. An apparatus for a first computer node for selecting a leader node to provide service to a plurality of other nodes in a multicast group, wherein each of the nodes communicates using multicast, broadcast or anycast messages, comprising:
one or more processors;
means for issuing a first election call message;
means for receiving candidacy announcement messages from one or more leader candidate nodes in a specified time period;
means for selecting a victor from among all leader candidate nodes from which candidacy announcement messages are received;
means for receiving one or more victor announcement messages from one or more leader victor nodes for a second specified time period;
means for resolving zero or more collisions among the victor announcement messages to result in selecting the leader node;
means for receiving, in the first election call message, first identity information specifying a second node that sent the first election call message;
means for pushing the identity information onto a stack;
means for receiving a second election call message that includes second identity information specifying a third node that sent the second election call message; and
means for ignoring the second election call message when the second identity information is found in the stack.

40. An apparatus as recited in claim 39, wherein the leader node is a key server that provides keys for use in encrypting multicast group messages.

41. An apparatus as recited in claim 39, wherein the leader node is a GDOI key server that provides keys to nodes according to Group Domain of Interpretation.

42. An apparatus as recited in claim 39, further comprising:
means for performing a coin toss operation that results in either a first result or a second result; and
means for sending a candidacy announcement message in response to the first result occurring, or awaiting the candidacy announcement messages from the one or more leader candidate nodes in response to the second result occurring.

43. An apparatus as recited in claim 39, wherein the means for selecting a victor further comprises:
means for determining whether the first computer node is the winner; and
means for sending a victor announcement message in response to determining that the first computer node is the winner.

44. An apparatus as recited in claim 39, further comprising means for ignoring any election call messages wile awaiting receipt of the one or more candidacy announcement messages.

45. An apparatus as recited in claim 39, wherein the means for selecting a victor comprises means for selecting one of the leader candidate nodes having a highest network address.

46. An apparatus as recited in claim 39, wherein he means for resolving any collisions comprises:
means for determining that two or more announcement messages have been received; and
means for issuing a second election call message.

47. An apparatus as recited in claim 39, wherein the election call message, candidacy announcement messages, and victor announcement messages are multicast, broadcast or anycast messages.

48. An apparatus as recited in claim 39, wherein each of the messages comprises a packet type value, sender sequence number value, sender identity value, and a digital signature of a node that sent the message.

49. An apparatus as recited in claim 39, further comprising means for digitally signing each of the messages.

50. An apparatus as recited in claim 39, further comprising:
means for creating a sequence number for each message that is sent;
means for digitally signing each message before sending the message; and
means for incrementing the sequence number.

51. An apparatus as recited in claim 39, further comprising means for issuing the first election call message only after failing to receive a reply to a key server discovery message that is sent by the first node upon newly joining a multicast group.

52. An apparatus as recited in claim 39, wherein the first node is a member of an ad hoc multicast group.

53. An apparatus for a first computer node for selecting a leader node to provide service to a plurality of other nodes in a multicast group, wherein each of the nodes communicates using multicast, broadcast or anycast messages, comprising:
   a network interface that is coupled to the data network for receiving one or more packet flows therefrom;
   a processor;
   one or more stored sequences of instructions which, when executes by the processor, cause the processor to carry out the steps of:
      issuing a first election call message;
      receiving candidacy announcement messages from one or more leader candidate nodes in a specified time period;
      selecting a victor from among all leader candidate nodes from which candidacy announcement messages are received;
      receiving one or more victor announcement messages from one or more leader victor nodes for a second specified time period;
      resolving zero or more collisions among the victor announcement messages to result in selecting the leader node;
      receiving, in the first elections call message, first identity information specifying a second node that sent the first election call message;
      pushing the identity information onto a stack;
      receiving a second election call message that includes second identity information specifying a third node that sent the second election call message; and
      ignoring the second election call message when the second identity information is found in the stack.

54. An apparatus as recited in claim 53, wherein the leader node is a key server that provides keys for use in encrypting multicast group messages.

55. An apparatus as recited in claim 53, wherein the leader node is a GDOI key server that provides keys to nodes according to Group Domain of Interpretation.

56. An apparatus as recited in claim 53, the sequences of instructions further comprising instructions for:
   performing a coin toss operation that results in either a first result or a second result; and
   sending a candidacy announcement message in response to the first result occurring, or awaiting the candidacy announcement messages from the one or more leader candidate nodes in response to the second result occurring.

57. An apparatus as recited in claim 53, wherein the step of selecting a victor further comprises the steps of:
   determining whether the first computer node is the winner; and
   sending a victor announcement message in response to determining that the first computer node is the winner.

58. An apparatus as recited in claim 53, the sequences of instructions further comprising instructions for ignoring any election call messages while awaiting receipt of the one or more candidacy announcement messages.

59. An apparatus as recited in claim 53, wherein selecting a victor comprises selecting one of the leader candidate nodes having a highest network address.

60. An apparatus as recited in claim 53, wherein resolving any collisions comprises:
   determining that two or more announcement messages have been received; and
   issuing a second election call message.

61. An apparatus as recited in claim 53, wherein the election call message, candidacy announcement messages, and victor announcement messages are multicast, broadcast or anycast messages.

62. An apparatus as recited in claim 53, wherein each of the messages comprises a packet type value, sender sequence number value, sender identity value, and a digital signature of a node that sent the message.

63. An apparatus as recited in claim 53, the sequences of instructions further comprising instructions for digitally signing each of the messages.

64. An apparatus as recited in claim 53, the sequences of instructions further comprising instructions for the steps of:
   creating a sequence number for each message that is sent;
   digitally signing each message before sending the message; and
   incrementing the sequence number.

65. An apparatus as recited in claim 53, wherein the sequences of instructions for issuing the first election call message are performed only after failing to receive a reply to a key server discovery message that is sent by the first node upon newly joining a multicast group.

66. An apparatus as recited in claim 53, wherein the first node is a member of an ad hoc multicast group.

* * * * *

UNITED STATES PATENT AND TRADEMARK OFFICE
CERTIFICATE OF CORRECTION

PATENT NO.       : 7,421,578 B1                                Page 1 of 1
APPLICATION NO. : 10/625445
DATED            : September 2, 2008
INVENTOR(S)      : Geoffrey Huang et al.

It is certified that error appears in the above-identified patent and that said Letters Patent is hereby corrected as shown below:

COLUMN 20
Claim 46: Line 44, delete "he" and insert --the--.

Signed and Sealed this

Twenty-eighth Day of October, 2008

JON W. DUDAS
*Director of the United States Patent and Trademark Office*